United States Patent [19]

Dudzik

[11] 4,349,405

[45] Sep. 14, 1982

[54] AUTOMATIC LABELING APPARATUS

[76] Inventor: Winfried Dudzik, Im Haegleskies, 7441 Neckartailfingen, Fed. Rep. of Germany

[21] Appl. No.: 183,859

[22] Filed: Sep. 3, 1980

Related U.S. Application Data

[63] Continuation-in-part of Ser. No. 920,406, Jun. 29, 1978, abandoned.

[51] Int. Cl.$^{3}$ .............................................. B32B 31/00

[52] U.S. Cl. .................................... 156/358; 156/361; 156/363

[58] Field of Search ................................ 156/540–542, 156/361, 362, 363, 584, 358; 100/52; 414/748

[56] References Cited

U.S. PATENT DOCUMENTS 3,780,883 2/1973 Brown ............................. 44/748 X 3,968,743 7/1976 Schermer ............................. 100/52

4,132,583 1/1979 Hodgson ......................... 156/542 X

*Primary Examiner*—David A. Simmons

*Attorney, Agent, or Firm*—Toren, McGeady & Stanger

[57] ABSTRACT

Apparatus for sequentially labeling objects differing from each other in size includes a conveyor which defines a path of movement in an approximately horizontal plane for the objects to be labeled. An arresting device arrests each object in a predetermined portion of the path toward which a face portion of a plunger is directed. The label to be applied is supplied to the face portion, and the plunger is moved toward the arrested object until the label is applied to the object by pressure exerted by the plunger. A reversing mechanism responds to the exerted plunger pressure for retracting the plunger from the labeled object.

34 Claims, 14 Drawing Figures

AUTOMATIC LABELING APPARATUS

CROSS-REFERENCE TO RELATED APPLICATIONS

This is a continuation-in-part application of prior application Ser. No. 920,406 filed on June 29, 1978 now abandoned.

SUMMARY OF THE INVENTION

This invention relates to labeling equipment, and particularly to automatic apparatus for applying pressure-sensitive labels to the objects which it is intended to label.

Most known labeling apparatus is either designed for labeling only identical objects in sequence, or it may be adjusted by an operator for accommodating runs of different objects. Labeling apparatus capable of handling a mixture of different objects without an operator's intervention requires complex automatic sensing and adjusting devices.

This invention aims at providing labeling apparatus capable of labeling sequential, different objects in precisely determined manner without adjustment by an operator or by complex automatic devices. In its more specific aspects, the invention provides apparatus capable of sequentially labeling objects similar to each other in shape, but greatly differing in size.

The invention will be described hereinbelow in its application to a problem heretofore incapable of simple solution, the automatic affixing of labels to beer barrels contiguously adjacent the bunghole of each barrel, the barrels varying greatly in size. It should be understood, however, that the invention is not limited to the described and illustrated application.

According to the invention, there is provided a conveyor which defines a path of movement in a plane for the object to be labeled. An arresting mechanism can arrest the object in a predetermined portion of its path. A face portion of a plunger directed toward an arrested object is supplied with a label, and the plunger moved toward the arrested object in a direction inclined relative to the plane of movement at an acute angle until the label is applied to the arrested object by pressure exerted by the plunger. A reversing device responds to the pressure exerted by the plunger on the object for retracting the plunger from the object.

In a preferred embodiment of the invention, the labeling apparatus is located within a housing which defines a pair of chambers. The housing is mounted on a supporting column so that it can be adjusted in the vertical and horizontal directions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 7*b* is a view, partly in section, taken along the line *7b—7b* in FIG. 7*a.

DETAIL DESCRIPTION OF THE INVENTION

Figures 1A, 1B:
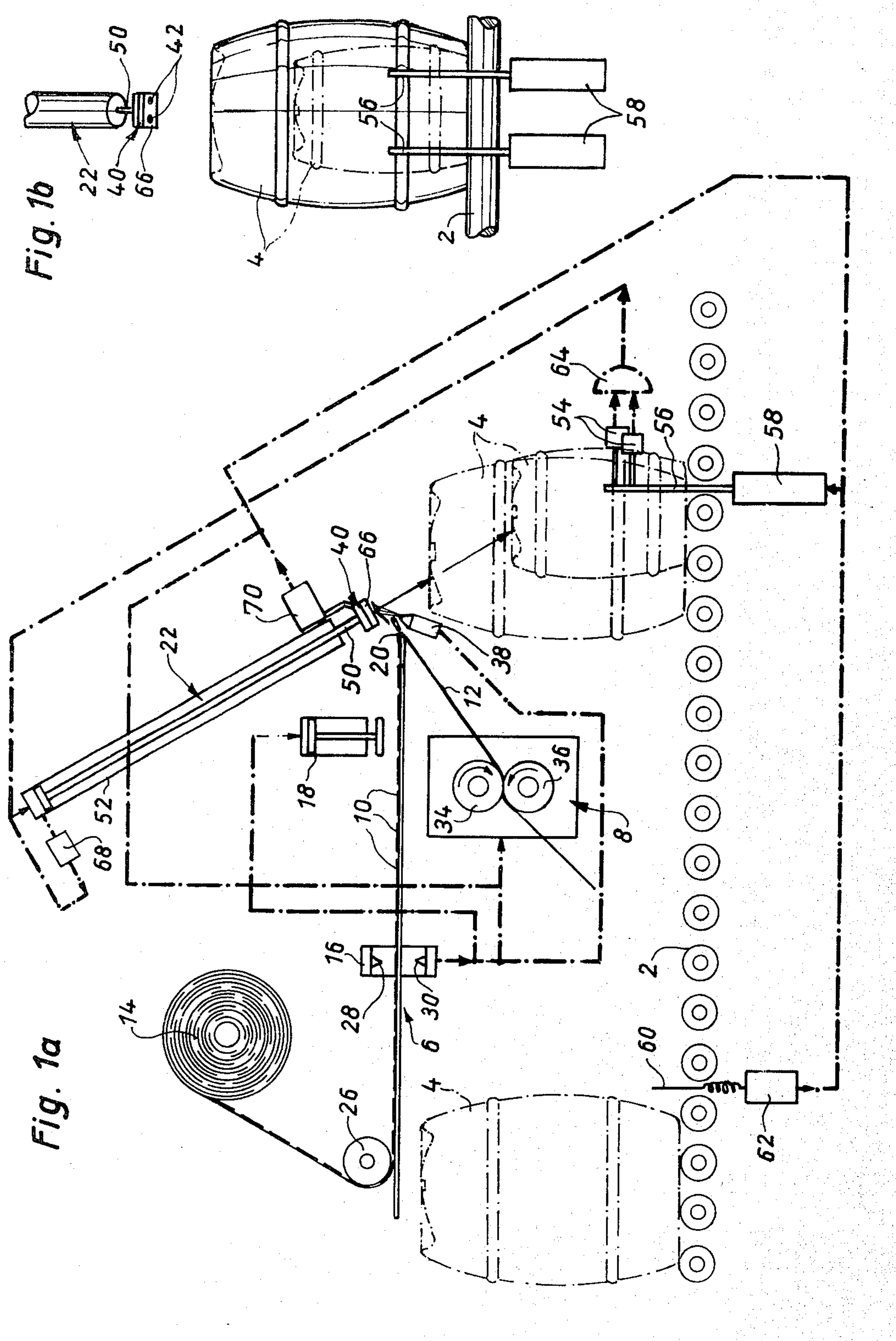
FIG. 1*a* shows the principal operating elements of beer barrel labeling apparatus of the invention in side elevation, and partly by conventional symbols.
FIG. 1*b* illustrates elements of the apparatus of FIG. 1*a* in front elevation.

Referring now to the drawing in detail, and initially to FIG. 1*a,* there is seen a horizontal roller conveyor 2 whose rollers are driven in a conventional manner, not shown, to convey beer barrels 4 in upright position from the left to the right, as viewed in FIG. 1, the barrels being shown in phanton view. The path of the barrels 4 passes below a label applicator 6 which includes a feeding mechanism 8 for the pressure-sensitive labels 10. The feeding mechanism 8 engages a backing strip 12 which covers the adhesive-coated faces of the labels 10 while the labels together with the backing strip are unwound from a supply reel 14 and directed into a horizontal path by a guide pulley 26.

Figure 3:
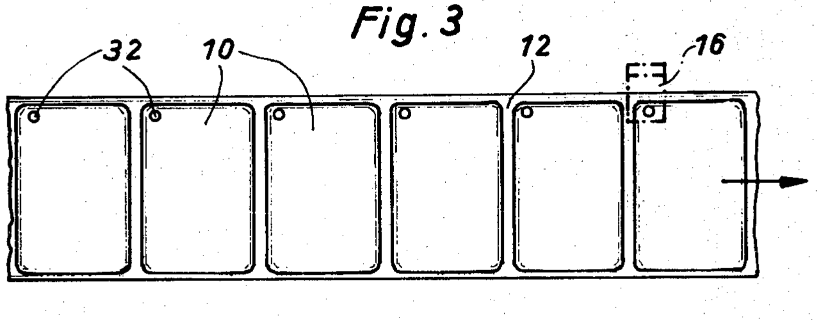
FIG. 3 is a top plan view of a label strip for use in both embodiments of the invention.

As is better seen in FIG. 3, the rectangular, identical labels 10 are spacedly juxtaposed on the backing strip 12, and a hole 32 is punched through one corner of each label and the subjacent part of the strip 12 so that the holes are vertically aligned with a sensing mechanism 16 during movement of the strip 12 in the direction indicated by an arrow in FIG. 3. As is shown in FIG. 1*a,* the sensing mechanism 16 essentially consists of an air discharge nozzle 28 and a signal generator 30 generating a pneumatic signal whenever a hole 32 permits a jet of air from the nozzle 28 to strike the signal generator 30 which is a commercially available product.

Figure 5:
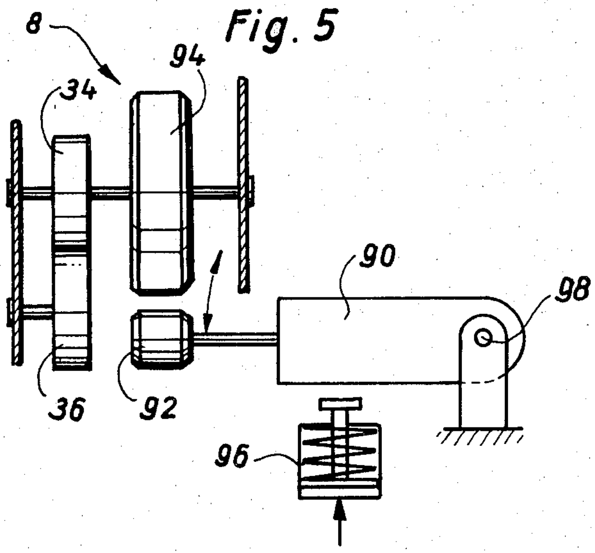
FIG. 5 illustrates a label feeding mechanism common to both illustrated embodiments, but omitted from FIGS. 2*a* to 2*d,* in enlarged front elevation.

The path of the strip 12 leads from the printing mechanism 18, now shown in detail, which prints identifying indicia on the labels 10. The strip 12 thereafter is bent sharply about a sheet metal edge 20, causing the labels 10 to be peeled off the strip 12. The strip then passes between a driven roller 34 and a pressure roller 36 of the feeding mechanism 8 and is discharged to waste. As is shown in FIG. 5, the feeding mechanism includes a pneumatic motor 90 whose continuously rotating output shaft carries a friction wheel 92. The motor 90 is mounted on a pivot shaft 98 and may be lifted from its illustrated rest position by a pneumatic jack 96 so that its output shaft moves in an arc indicated by a double arrow, and the friction wheel 92 engages another friction wheel 94 on the shaft of the driven roller 34.

Figure 4:
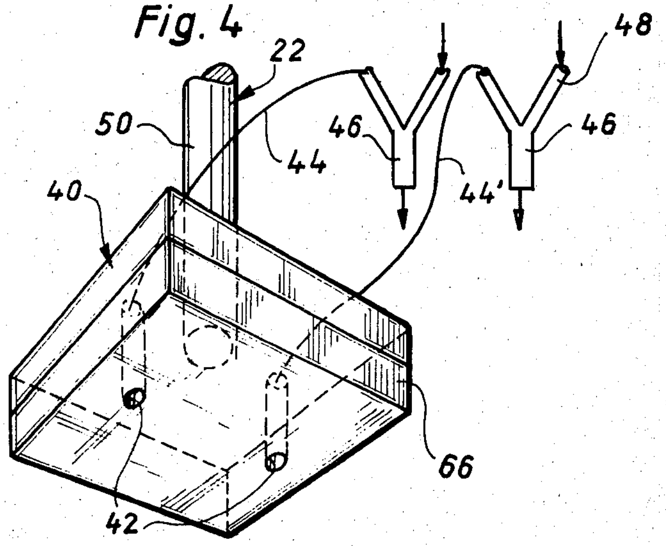
FIG. 4 is a perspective, fragmentary view of a plunger common to the two illustrated embodiments, and includes a conventional representation of vacuum equipment associated with the plunger.

An air nozzle 38 is located adjacent the edge 20 to transfer each peeled-off label 10 by means of an air jet from the strip 12 to a face portion 66 of the enlarged head 40 of a plunger 50 in a double-acting, reciprocating pneumatic motor 22 The head 40 and associated elements are shown on a larger scale in FIG. 4. The face portion 66 consists of a pad of elastomeric foam, such as foam rubber. The orifices 42 of two ducts in the face portion 66 lead into suction lines 44, 44' from which air is drawn by respective small jet pumps 46, each pump being a Y-fitting one branch 48 of which receives compressed air, as indicated by arrows. A label 10 is blown from the edge 20 toward the face portion 66 is held fast thereon by suction even if one of the dual suction devices should malfunction for any reason.

FIG. 1*a* shows the plunger 50 in its starting position in the cylinder 52 of the pneumatic motor 22 in which the enlarged top end of the plunger is near another pneumatic signal generator 68 which is a pressure-actuated valve sensing the pressure in the cylinder 52 above the plunger 50 and generating a pneumatic signal when that pressure exceeds a certain value, as will be described below in more detail. The actuator of another signal generating valve 70 is engaged by the head 40 when the plunger 50 is retracted to the illustrated position. Compressed air admitted to the cylinder 52 above the plunger 50 drives the plunger axially out of the cylinder 52 in a direction, indicated by straight arrows, which is inclined at an acute angle of about 60° to a portion of the barrel path defined by the conveyor 2 in which two barrels 4 are indicated in superimposed phantom views.

The two barrels differ greatly in size and capacity, but are similar in shape. Their positions are defined by two vertical abutment rods 56 which prevent further barrel travel on the conveyor 2 when they are extended into the plane of barrel movement by associated pneumatic jacks 58 as is evident from joint consideration of FIGS. 1*a* and 1*b*. The abutment rods 56 arrest both the bigger and the smaller barrel 4 in a position in which the plunger head 40 will strike corresponding spots on the radial, dished top walls of the two barrels near their bung holes when the plunger 50 is ejected from the cylinder 52. Valves 54 on the abutment rods 56, too small for pictorial representation on the scale of FIG. 1*b* and indicated in FIG. 1*a* by conventional symbols, are connected to a pneumatic AND gate 64 whose function will presently be explained.

A resilient sensing rod 60, when struck by a barrel entering the illustrated labeling apparatus on the conveyor 2, opens a valve 62 which causes the pneumatic jacks 58 to extend their respective abutment rods 56 into the barrel path and thereby to arrest the entering barrel in proper alignment with the plunger 50. The pneumatic circuits connecting the valve 62 with the jacks 58 and also connecting other pneumatically operated elements of the labeling apparatus are indicated by chain-dotted lines in FIG. 1*a*, and the flow of pneumatic signals between the elements is indicated by arrows, as far as feasible.

The barrel striking the abutment rods 56 opens the valves 54, and the signal thereby generated can pass the AND gate 64 only if both rods 56 are struck, a condition met only when the barrel is properly centered relative to the rods 56 in the manner best seen in FIG. 1*b*. The signal transmitted by the AND gate 64 causes air to be admitted to the top end of the cylinder 52 so that the plunger 50 is expelled until its head 40 carrying a label 10 engages the top wall of a barrel 4 held in proper position by the rods 56. The pad 66 deforms under the pneumatic pressure as needed to cause transfer of the label 10 from the head 40 to the top wall of the barrel even though the wall is not flat, but somewhat dished. Air pressure thereafter is built up in the cylinder 52 above the plunger 50 until the threshold value for actuating the valve 68 is reached, and the valve 68 causes reversal of air supply to the cylinder 52 so as to retract the plunger 50 toward the illustrated starting position, leaving the label 10 affixed to the barrel 4 by its pressure-sensitive coating. The necessary reversing valve is not shown since it is well known.

Upon return of the plunger 50 to its starting position, the head 40 strikes the actuator of the valve 70, and the pneumatic signal thereby generated causes the jacks 58 to withdraw the abutment rods 56 below the conveyor 2 so that the continuously rotating rollers of the conveyor can discharge the labeled barrel. The valve 70 also causes the pneumatic jack 96 of the feeding mechanism 8 to lift the motor 90 for a period sufficient to cause the backing strip 12 to be advanced by the length of one label 10 or the spacing of two holes 32, the feeding mechanism being stopped when the next hole 32 reaches the sensing mechanism 16, whereby the next available label is peeled off the backing strip 12 at the edge 20, and the nozzle 38 is supplied with compressed air long enough for transferring the peeled-off label 10 to the pad 66 on the head 40 of the retracted plunger 50. While the feeding mechanism 8 stands still, the printing mechanism 18 is activated to imprint a serial number or other information on the label positioned thereunder having passed the sensing mechanism 16 and prior to being separated from the backing strip 12. The label application 6 is ready for the next cycle to be initiated by a barrel 4 striking the resilient sensing rod 60.

The label 10 is not affixed to a precisely defined location of the barrel end wall unless the barrel is positioned on the conveyor 2 in the proper angular position relative to its upright axis, and consecutive barrels are adequately spaced from each other. Equipment for automatically so positioning the barrels is available. Labeling is usually preceded by washing of the barrel cavity, and commonly employed automatic washing equipment discharges barrels after draining of washing liquid through the bung holes in the necessary position.

The labeling apparatus is illustrated in FIGS. 2*a* to 2*d* only as far as it differs from the embodiment described in detail with reference to FIGS. 1*a*, 1*b* and 4 to 5, barrels 4 are conveyed into proper alignment of a radial end wall with a plunger 50' and a cylinder 52', on two rails 2' slightly inclined relative to the horizontal so that each barrel 4 rolls along the rails until arrested by a receptacle 72. The receptacle has two planar skeleton walls 78, 80, each of which is constituted by two bars radially extending from a pivot shaft 76, as shown for the wall 80 in FIG. 2*c*. The shaft 76 is journaled in a stationary support, not shown, and the receptacle 72 may be pivoted on the shaft 76 between the two terminal positions shown in FIGS. 2*a*, 2*d* respectively through an intermediate position illustrated in FIGS. 2*b*, 2*c* by means of a double-acting, pneumatic cylinder 74.

Figure 2A:
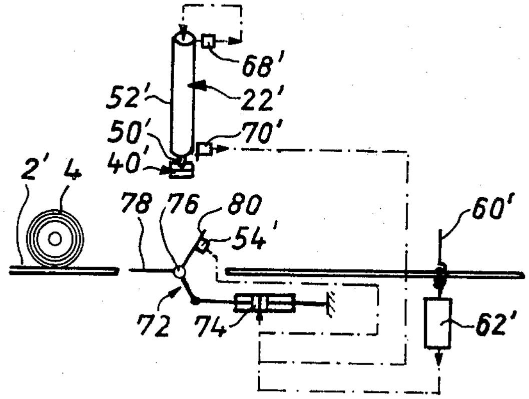
FIG. 2*a* is a simplified side-elevational view, partly in conventional symbols, of those elements of a second embodiment of the invention which differ from corresponding elements of the apparatus of FIGS. 1*a* and 1*b;*
Figure 2B:
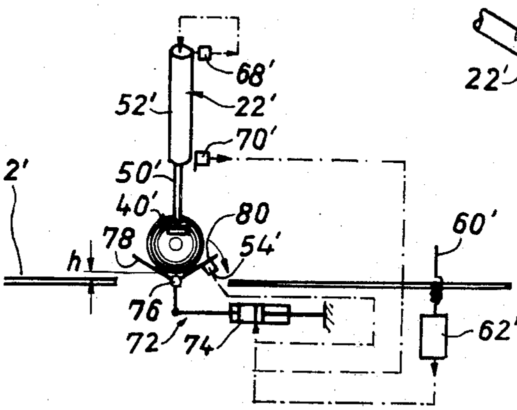
FIGS. 2*b* and 2*d* show the apparatus of FIG. 2*a* in different, respective, operating positions.
Figure 2C:
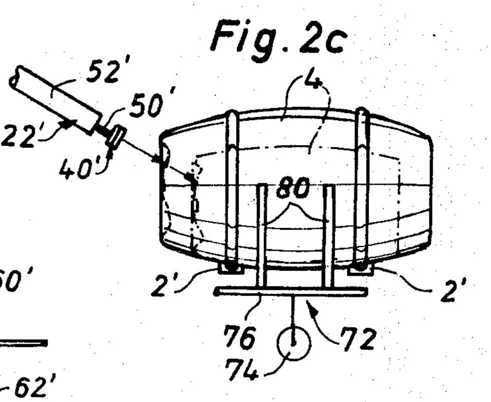
FIG. 2*c* shows elements of the apparatus of FIG. 2*b* in front elevation in yet another operating position.
Figure 2D:
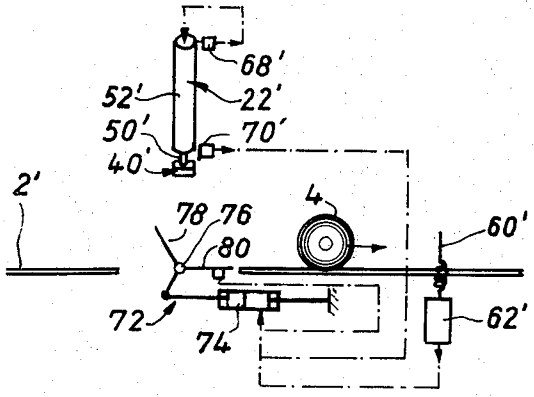

The two walls 78, 80 are inclined relative to each other at an obtuse angle of approximately 135° and are aligned with the plane of movement of the barrels 4 on the rails 2' in the positions of FIGS. 2a, 2d respectively. In the intermediate position, the walls 78, 80 diverge substantially symmetrically from a vertical plane through the axis of the shaft 76, but the receptacle 72 is also open in an upward direction in its terminal positions.

The axis of the cylinder 52, and the direction of movement of the plunger 50' in the pneumatic motor 22' are inclined at an acute angle relative to the plane of barrel movement, as is best seen in FIG. 2c. Whereas the plunger 50 of the first-described embodiment was acutely inclined relative to the plane of barrel movement in a vertical plane parallel to the barrel path, the structurally practically identical plunger 50' moves in the vertical plane of FIG. 2c which is perpendicular to the path of the rolling barrels 4 because of the different orientation of the barrel end walls which it is desired to label. However, it is evident from the showing of a larger barrel 4 in fully drawn lines in FIG. 2c, and of a smaller barrel superimposed in phantom view that the angular relationship between the direction of plunger movement and the plane of barrel movement is equally effective in the second embodiment of the invention to deposit labels on precisely corresponding parts of both barrels.

The operation of the apparatus shown in FIGS. 2a–2d is controlled by valves 54', 62' 68', 70' structurally closely similar to the valves 54, 62, 68, 70 described above. When a barrel 4 rolls into the receptacle 72 in the terminal angular position of the receptacle shown in FIG. 2a, it is arrested by abutting engagement with the bars of the skeleton wall 80, and it starts the labeling cycle by actuating a valve 54' on the wall.

The valve 54' causes the cylinder 74 to turn into the intermediate position of FIG. 2c in which the barrel is raised a small distance h over its path on the rails 2' as indicated in FIG. 2b only. Air thereafter admitted to the top of the cylinder 52' causes the label-bearing head 40' to be pressed against the radial end wall of the barrel as is shown in FIG. 2b. The pressure built up thereby above the plunger 50' in the cylinder 52' is sensed by the pressure-actuated valve 68' which causes release of air from the top of the cylinder 52' and admission of air to the lower part of the cylinder so that the plunger 50' is retracted until its head 40' engages the actuator of the valve 70'. The valve causes the cylinder 74 to pivot the receptacle 72 from its intermediate position into the terminal position of FIG. 2d, and the resulting descent of the barrel 4 starts the barrel rolling away from the labeling apparatus on the rails 2'. As it passes a resilient sensing rod 60', the valve causes return of the receptacle 72 to its starting position shown in FIG. 2a, and a new cycle can begin.

The portion of the second embodiment of the invention which applies labels to the plunger head 40' has not been shown since it is not significantly different in its structure from the corresponding portion of the labeling apparatus of FIGS. 1a, 1b. Its operating cycle is initiated by the valve 70' in the same manner, not again illustrated, as in the first-described labeling apparatus.

Figure 6A:
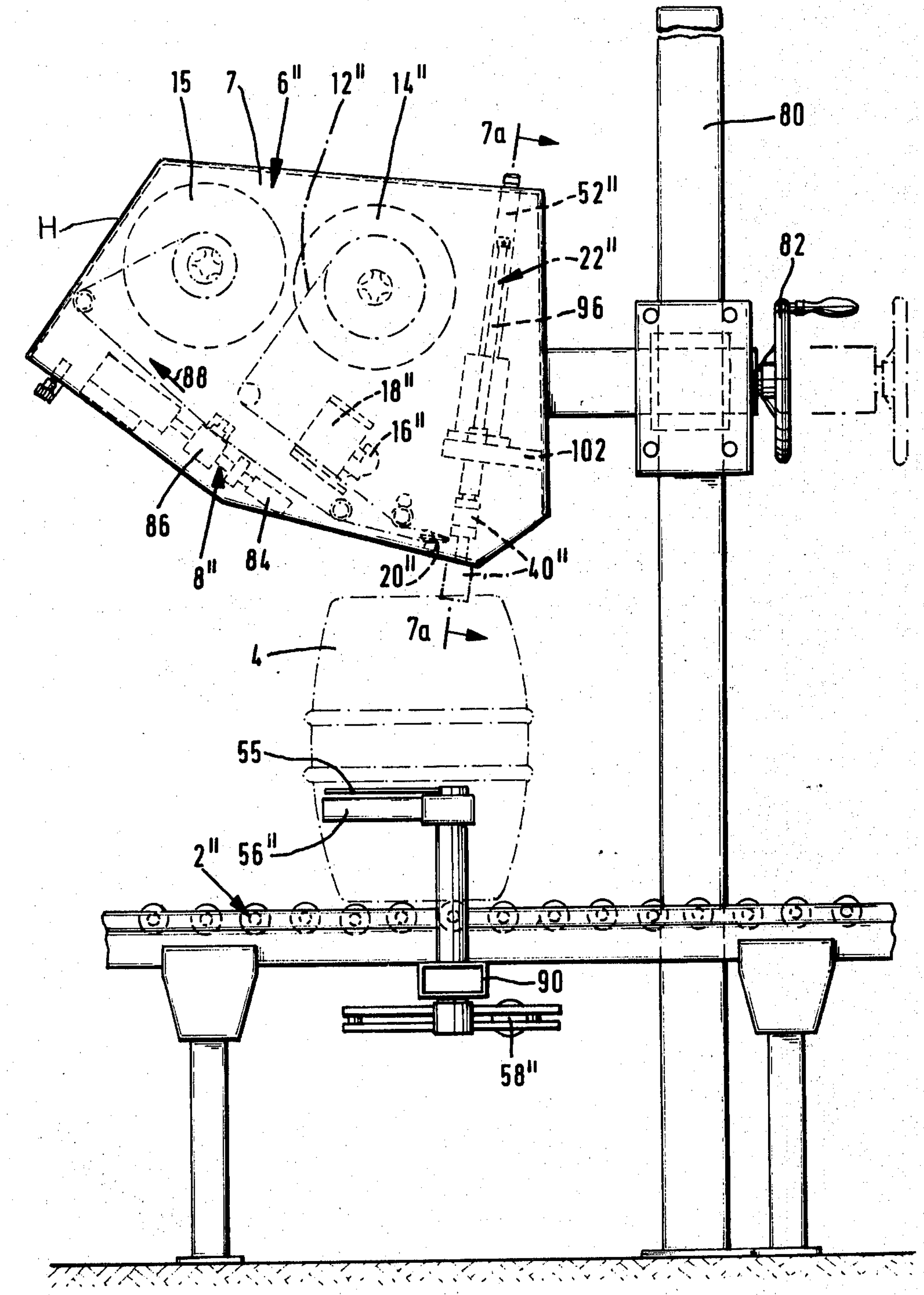
FIG. 6*a* is an elevational view of another embodiment of a beer barrel labeling apparatus embodying the present invention.
Figure 6B:
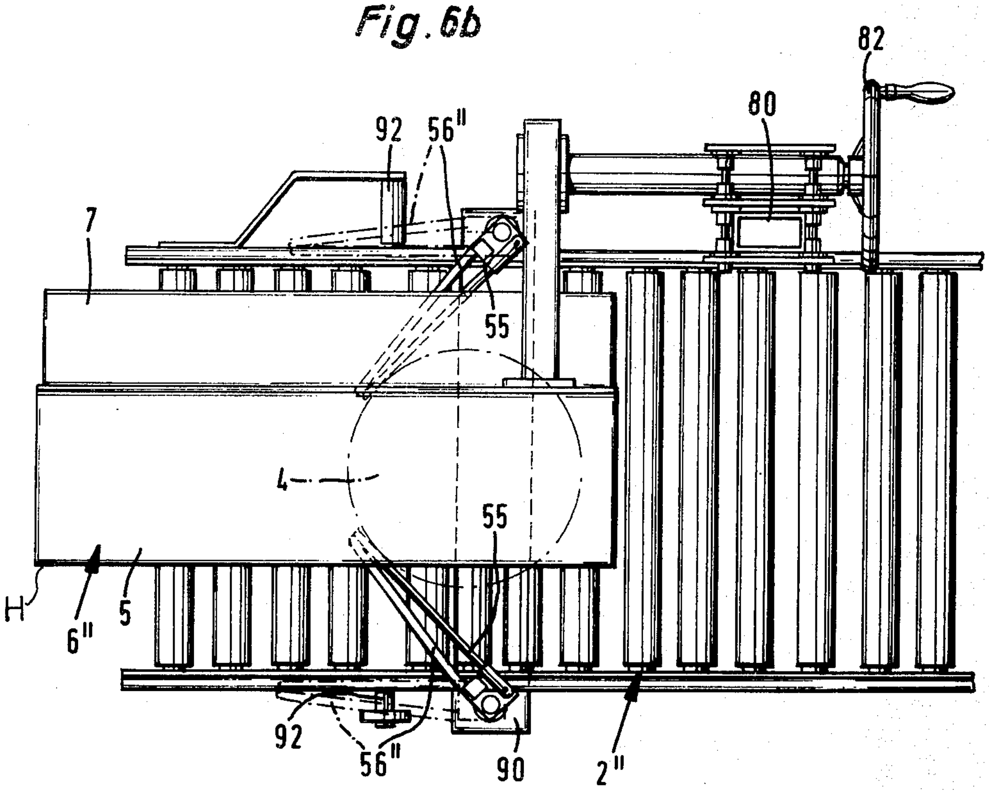
FIG. 6*b* is a top view of the embodiment shown in FIG. 6*a;*

In FIGS. 6a and 6b a labeling apparatus 6" is contained within a housing H which defines a pair of chambers 5, 7. The housing H is mounted on a vertical supporting column 80 extending upwardly above a conveyor 2" with the supporting column being located along one side of the conveyor, note FIG. 6b. A crank 82 is mounted on the supporting column 80 and is attached to the housing H for both vertically and horizontally adjusting the position of the housing. The inclination of the housing H, and, consequently, of pressing mechanism 22" located within the housing can be adjusted with respect to the central axis of the barrel to be labeled with the adjustment being effected about a horizontal axis extending perpendicularly to the axis of the crank 82.

As can be seen in FIG. 6b the two chambers 5, 7 formed within the housing H extend alongside one another in the direction of movement of the barrels over the conveyor 2". For purposes of description chamber 7 will be denoted as the first chamber and chamber 5 as the second chamber. First chamber 7 contains the pneumatic control unit and the lines required to control the pneumatic motor or label applying device 22" and the label strip advancing means. Second chamber 5 is easily accessible by removing the housing and contains the pnuematic motor or label applying device 22" along with a supply reel 14" and a winding reel 15 for taking up label strip 12". In addition, the second chamber contains a label printing mechanism 18", a sensing device 16" and a label feeding mechanism in spaced relation to a label dispensing edge 20". Feeding mechanism 8" consists of a clamping device 86 which holds the blank strip during movement in the direction of the arrow 88 and releases the blank strip during movement in the opposite direction.

As indicated in FIG. 6a the barrels 4 travel over the conveyor 2" in the upright position, that is with the central axis of the barrel extending perpendicular to the surface of the conveyor with one end wall of the barrel being supported on the conveyor and the other end wall providing the surface to be labeled. To stop and center the barrels moving over the conveyor 2", a pair of centering rods 56" are provided upwardly from the conveyor surface and are mounted on a traverse support rod 90. Each centering rod 56" is pivotally supported about a vertically extending axis and the centering rods are pivoted by a pneumatically operated adjusting mechanism 58" located below the conveyor along with the traverse support 90. In FIG. 6b centering rods 56" are shown in solid line representing the holding position for a barrel 4 to be labeled, and in dot-dash line representing the outwardly displaced positions of the centering rods permitting a labeled barrel to continue its path of movement over the conveyor. The labeling operation is commenced by two control valves, not shown, each of which is actuated by a lever 55 pivoted on each of the centering rods 56". The levers 55 are pivoted relative to the centering rods by the barrel moving into position against the centering rods. It is only when both levers 55 are actuated with the barrel properly centered, that the labeling operation is released and the plunger head 40" moves obliquely downwardly against the upper end face of the barrel 4.

After a barrel has been labeled, the centering rods 56" are opened to the position shown in dot-dash lines in FIG. 6b permitting the barrel to continue along its path of movement over the conveyor. As the labeled barrel moves away from the centering rods 56", the rods are closed via a light barrier 92 which emits a signal as the barrel leaves the region of the centering rods.

Plunger head 40" is secured to a carrier plate 94 positioned at the lower or free end of plunger or piston rod 50" of a double-acting pneumatic cylinder 52". In addition, the lower ends of two guide rods 96, each located on an opposite side of the pneumatic cylinders 52″, are arranged in parallel with the piston rod axis and are connected to the carrier plate. Guide rods 96 are guided in sleeves 98 with a certain rolling friction afforded by a sleeve-like arrangement of spheres or balls 100. The guide sleeves are firmly connected to the housing H by an arm 102.

Figure 7C:
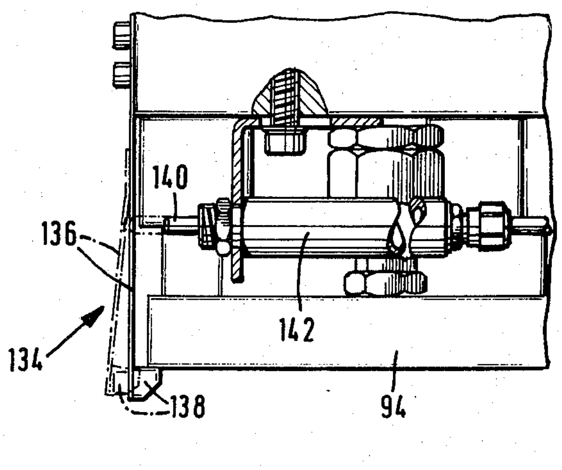
* and FIG. 7*c* is a partial view of the structure shown in FIG. 7*a* and 7*b* taken in the direction of the arrow shown on the right side of FIG. 7*b.*

Piston cylinder 52″ is fixed to a supporting sleeve 104 which, in turn, is slidably supported in the vertical direction in a guide sleeve 106. Supporting sleeve 104 and along with it the piston cylinder 52″ is movable within the guide sleeve 106 against biasing action of several concealed pressure springs 108. A spring ring 110 is fixed into a circumferential groove in the upper end of the supporting sleeve 104 and contacts the upper end face 112 of guide sleeve 106 in the lower end position of the supporting sleeve. As can be seen in FIG. 7*b*, a lug 116 extends laterally outwardly through the sleeve into a longitudinal slot 114 in the guide sleeve 106. The lug 116 projects outwardly from the guide sleeve. When the supporting sleeve 104 moves upwardly the outer end of lug 116 contacts a tappet 118 of a control valve 120 mounted on the guide sleeve, note FIG. 7*b*, and the directional movement of the piston or plunger rod 50″ is reversed by the control valve.

During the labeling operation, the movement of the plunger head 40″ is reversed as the plunger face contacts the end surface of the barrel to be labeled and is pressed against the end surface during any further outward movement of the plunger or piston rod 50″. With the self-adhesive label pressed onto the end face of the barrel, the movement of the piston cylinder 52″, including the supporting sleeve 104 and the actuating pin 116, is reversed and is lifted off the barrel against the biasing force of the spring 108.

Figure 7A:
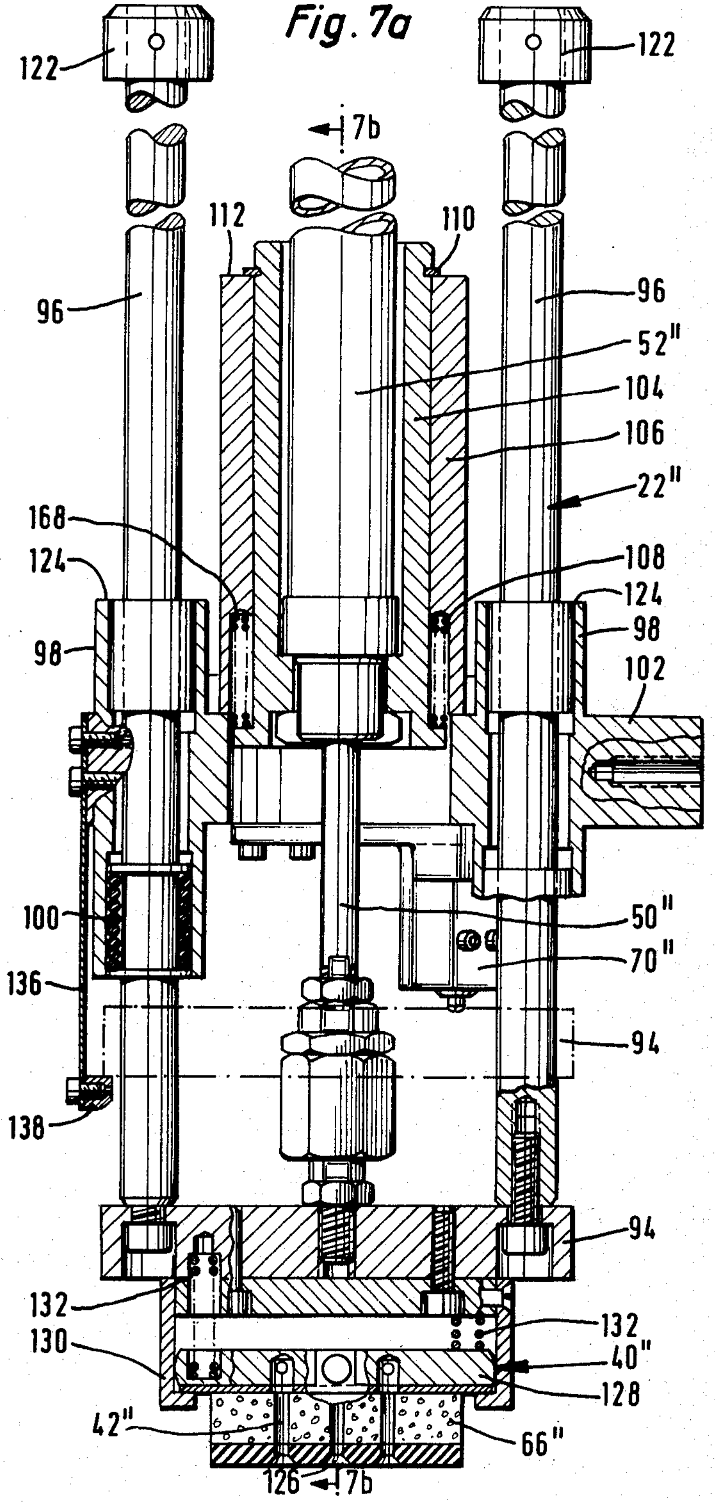
FIG. 7*a* is a view partly in section taken along the line *7a—7a* of FIG. 6*a;*
Figure 7B:
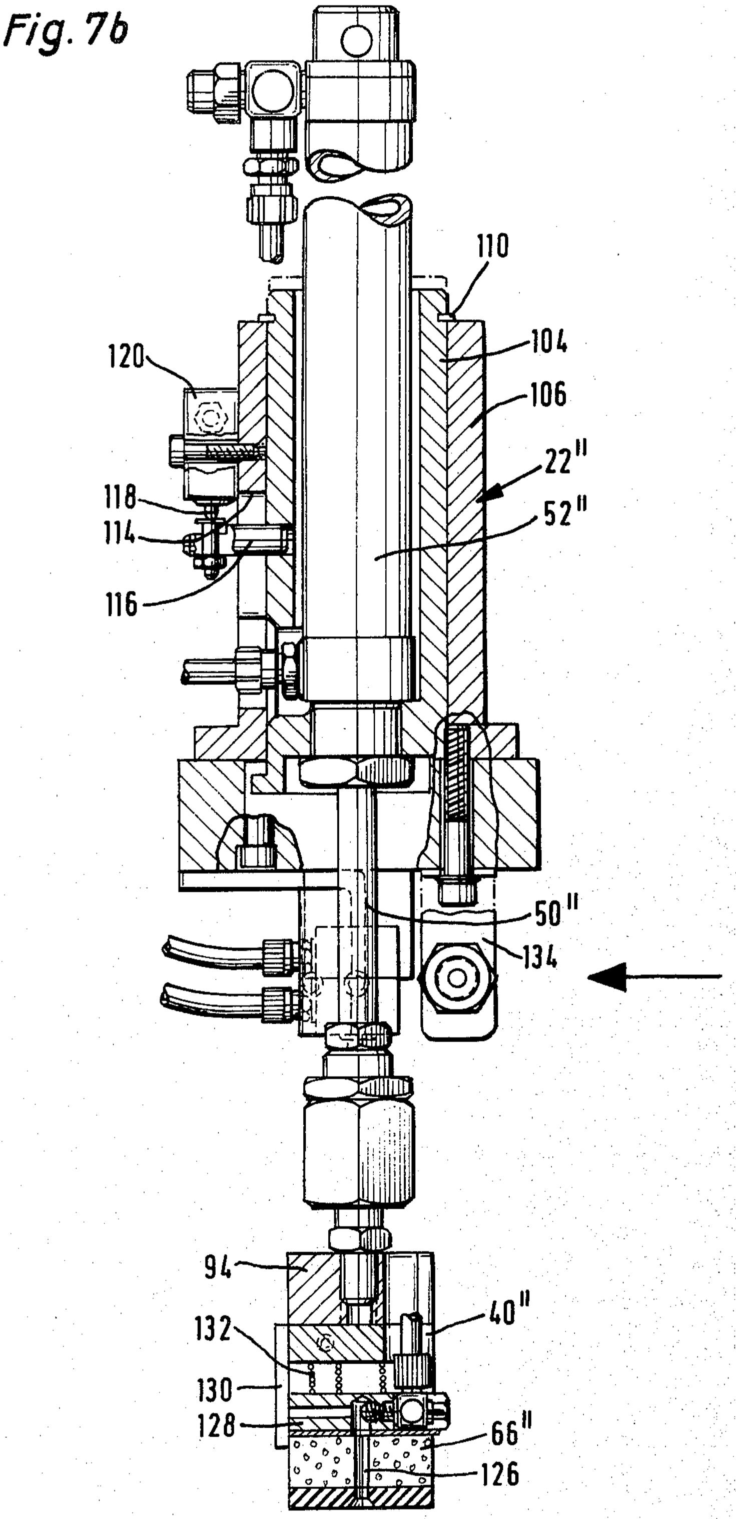

To ensure the reversal of the piston movement even when the piston rod is advanced unintentionally or for test purposes and no barrel is present in position to be labeled, axially adjustable rings 122 are secured at the trailing ends of the guide rods 96, that is, the upper ends as viewed in FIG. 7*a*. When the lowermost end position of the plunger head 40″ is reached, rings 122 strike the upwardly directed end faces 124 of the guide sleeves 98 so that the piston cylinder 52″ and the supporting sleeve 104 are moved upwardly relative to the guide sleeve 106 until the tappet 118 of control valve 120 is contacted by the actuating pin 116 and reversal of movement is initiated.

When the piston cylinder 52″ completes its upward movement, the carrier plate 94 supporting the plunger head 40″ contacts the tappet valve 70″, note FIG. 7*a*, and the tappet valve controls the adjusting mechanism 58″ and the feeding mechanism 8″. In this way the labeled barrel 4 is released when the centering rods 56″ are opened permitting the barrel to continue its path of movement of the conveyor. Further, label strip 12″ is pulled forward by the spacing between a pair of adjacent holes and the next label to be applied to the plunger face 40″ is loosened from the strip. The loosened label is applied against the plunger face and is held firmly by suction acting on the openings 42″. A third opening 126 is located in the end face of the plunger head 40″ and this opening supplies air when the plunger head strikes against the barrel with the simultaneous disconnection of the suction action. With this arrangement when the labeling operation is carried out on sub-cooled barrels with a moist surface, a reliable transfer of the label onto the barrel is assured.

Plunger head 40″ includes a flexible foam block 66″ backing the end face surface and attached on the opposite side from the end face surface to a stiff metal or plastic plate 128. The foam block permits the plunger head to adjust to a certain unevenness in the surface of the barrel when a label is being applied. To balance out any greater deviations in the uneveness or curvature of the barrel and surface, plate 128 is displaceably mounted for movement into different angular positions within a cage 130 containing several springs 132 so that the plate 128 can adapt to the load distribution during label application.

The label applying device is also equipped with a locking mechanism 134, note FIGS. 7*a*, 7*b* and 7*c*, which retains the plunger head 40″ in the upper position when no pressure is supplied into the pneumatic system and avoids any accidental movement of the plunger head in the downward direction due to its own weight. Locking mechanism 134 includes a flat spring 136 clamped in position for effecting the movement indicated in FIG. 7*c*. The lower or free end of the flat spring 136 supports a locking pin 138 which engages the lower face of the carrier plate 94 for affording the desired locking action. Flat spring 136 and locking pin 138 can be moved with the aid of a piston rod 140 projecting outwardly from a single-action pneumatic cylinder 142, note FIG. 7*c*. The locked position of the spring is shown in solid line while the released position is shown in dot-dash line. During labeling operation, flat spring 136 is maintained in the open or unlocked position by the pneumatic cylinder 142 because the piston rod 50″ can be held in the upper position by the piston cylinder 52″. When the labeling apparatus is turned off, and the pressure within the piston cylinders 52″, 142 is released, the piston rod 140 is pulled back by spring tension and the locking pin 138 enters its locking position and holds the plunger head firmly in its upper end position.

While specific embodiments of the invention have been shown and described in detail to illustrate the application of the inventive principles, it will be understood that the invention may be embodied otherwise without deparating from such principles.

What is claimed is:

1. Apparatus for sequentially labeling container-shaped objects, such as beer barrels, similar to each other in shape but differing from each other in size and with each object having a labeling surface located in the same general location thereon and comprising:

(a) conveying means defining a path of movement for said objects along a generally planar horizontal surface;

(b) pneumatically operated arresting means movable into the path of movement of said objects along said horizontal surface for arresting each object in a predetermined support position in said path with the object being supported at a location on its exterior surface spaced from the labeling surface and with the labeling surfaces of the objects of a different size being at different distances from the support position;

(c) a pneumatically controlled axially elongated plunger located upwardly from the labeling surface in the predetermined position and having a face portion at one end thereof with said face portion extending transversely of the axial direction of said plunger and being directed toward an object arrested in said support position, said face portion being deformable under pneumatic pressure for transferring a label to the labelling surface;

(d) supply means for supplying a label to said face portion at a spaced distance from the labeling surface, said supply means including a pneumatically operated sensing mechanism for indicating the position of labels as they are moved toward said face portion of said plunger;

(e) pneumatically operated and controlled means for moving said plunger along a rectilinear path between a first position where said face portion is supplied with a label to a second position at a variable distance from the first position based on the size of said object being labeled where the label is applied to the labeling surface of said arrested object in the predetermined position and with the rectilinear path of said plunger being disposed at an acute angle substantially different from a right angle to the planar horizontal surface of the path of movement and to the labeling surface of said objects; and (f) pneumatically operated reversing means responsive to a predetermined force exerted by said plunger on the labeling surface of said object being labeled for retracting said plunger from said object back to the first position.

2. Apparatus as set forth in claim 1, wherein said pneumatically operated means for moving said plunger include a pneumatic cylinder having an axis extending along the rectilinear path of said plunger, said plunger being axially guided in said cylinder toward and away from said first position, said reversing means including means for sensing the pressure in said cylinder and for controlling the supply of air to said cylinder in response to the sensed pressure of said plunger against the labeling surface for retracting the plunger toward said first position.

3. Apparatus as set forth in claim 2, wherein said supply means include feeding means for feeding said label to a ready position intermediate said predetermined position in said path and said face portion in said first position of the plunger, air jet means for pneumatically transferring said label from said ready position to said face portion, and jet control means for controlling operation of said air jet means in timed sequence with the moving and the retracting of said plunger.

4. Apparatus as set forth in claim 1, further comprising suction means, said face portion being formed with an opening connected to said suction means for drawing air inward of said opening and for thereby retaining a supplied label on said face portion during the moving of said plunger from said first position to said second position.

5. Apparatus as set forth in claim 4, further comprising suction control means for deactivating said suction means in timed sequence with the moving and the retracting of said plunger.

6. Apparatus as set forth in claim 4, wherein said face portion consists essentially of yieldably resilient material.

7. Apparatus as set forth in claim 1, wherein said arresting means include an abutment member, pneumatically operated abutment actuating means for moving said abutment member into and out of said path, and pneumatically operated control means controlling operation of said actuating means in timed sequence with the moving and the retracting of said plunger.

8. Apparatus as set forth in claim 1, wherein said arresting means include an upwardly open receptacle mounted for angular movement about an axis extending transversely of said path between two terminal positions and an intermediate position, said receptacle having two walls offset at an obtuse angle relative to one another, each of said walls being approximately alignable with said planar horizontal surface in one of said terminal positions, and pneumatically operated positioning means for sequentially positioning said receptacle in said positions thereof in timed sequence with the moving and the retracting of said plunger.

9. Apparatus, as set forth in claim 1, including a housing forming a chamber therein, said plunger mounted in the chamber in said housing and including an axially extending piston cylinder axially slidable relative to said housing, and said reversing means comprises a control valve attached to said housing and being actuated by said piston cylinder as it moves axially relative to said housing.

10. Apparatus, as set forth in claim 9, including guide means secured within said housing for guiding said piston cylinder, said piston cylinder being slidably displaceable relative to said guide means, and spring means in engagement with said guide means and said piston cylinder for biasing said piston cylinder in the axial direction thereof.

11. Apparatus, as set forth in claim 9, wherein said piston cylinder includes a piston rod and a piston head attached to the end of said piston rod outwardly from said piston cylinder, said piston head being movable into contact with the object to be labeled and said piston cylinder being movably displaceable when said piston head contacts the object to be labeled.

12. Apparatus, as set forth in claim 9, wherein at least one guide rod located in said housing for guiding said piston rod and piston head, a stop in said housing in the path of said guide rod and said guide rod being movable into contact with said stop during the movement of said piston rod and piston head toward the object to be labeled.

13. Apparatus, as set forth in claim 1, wherein said piston head having an end face for receiving labels to be transferred from the end face to the object to be labeled, an opening through said piston head being open at said end face thereof, said opening being arranged to be connected to a source of pressurized air.

14. Apparatus, as set forth in claim 1, including a pneumatically actuatable locking device located in said housing for holding said piston head in the retracted position.

15. Apparatus, as set forth in claim 14, wherein said locking device includes a spring biased locking member, a pneumatic cylinder including a piston rod displaceable into contact with said locking member for displacing said locking member into the unlocked position, said locking member being spring-biased into the locked position.

16. Apparatus, as set forth in claim 9, including an upwardly extending support for mounting said housing, means in combination with said upwardly extending support for adjustably positioning said housing in the vertical and horizontal directions.

17. Apparatus, as set forth in claim 8, wherein said arresting means comprises a traverse support extending across the direction of movement of the objects to be labeled over said conveying means, a pair of upwardly extending supports secured to said traverse support extending upwardly above said conveying means, a centering rod secured to the upper end of each of said supports and each said center rod being pivotably movable about the axis of said support between a first position extending inwardly over said conveying means and a second position spaced laterally outwardly from said first position so that in the first position said centering rods center and hold the object to be labeled in position and in the second position said centering rods release the labeled object for continued movement over said conveying means.

18. Apparatus for sequentially labeling generally cylindrically configured container-shaped objects, such as beer barrels, having an exterior surface comprising at least a side wall of an arcuate configuration around a central axis and end walls extending transversely of the central axis and across the opposite ends of the side wall, and the objects being similar to each other in overall shape but differing from each other in size and with each object having a labeling surface located on one end wall in the same general location thereon for the various sized objects and comprising:

(a) conveying means defining a path of movement for said objects along a generally planar horizontal surface;

(b) pneumatically operated arresting means movable into the path of movement of the objects along said horizontal surface for arresting each object by contacting the arcuate side thereof in a predetermined support position in said path with the object being supported at a location on its exterior surface spaced from the labeling surface and with the labeling surfaces of the objects of different size being spaced at different distances from the predetermined support position and following the label application said arresting means being movable out of the path of movement of the objects so that the labeled object can continue along the path of movement away from said arresting means, said arresting means comprising at least a pair of movable members for contacting the side wall of the object to be labeled at spaced locations;

(c) a pneumatically controlled axially elongated plunger located upwardly from the labeling surface of an object in the predetermined support position and having a face portion at one end thereof with said face portion extending transversely of the axial direction of said plunger and being directed toward an object arrested in said predetermined support position, said face portion being deformable under pneumatic pressure for transferring a label to the labeling surface;

(d) supply means for the stepwise supply of individual labels to said face portion at a spaced distance from the labeling surface located in the predetermined support position, said supply means including a pneumatically operated sensing mechanism for indicating the position of labels as they are moved toward said face portion of said plunger;

(e) pneumatically operated and controlled means for moving said plunger along a rectilinear path between a first position where said face portion is supplied with a label by said supply means to a second position at a variable distance from the first position based on the size of said object being labeled where the label is applied to the labeling surface of said arrested object in the predetermined support position and with the rectilinear path of said plunger being disposed at an acute angle substantially different from a right angle to the planar horizontal surface of the path of movement and to the central axis of the object being labeled, and (f) pneumatically operated reversing means responsive to a predetermined force exerted by said plunger on the labeling surface of the object being labeled for retracting said plunger from said object for returning said face portion to the first position.

19. Apparatus as set forth in claim 18, wherein said pneumatically operated means for moving said plunger include a pneumatic cylinder having an axis extending along the rectilinear path of said plunger, said plunger being axially guided in said cylinder toward and away from said first position, said reversing means including means for sensing the pressure in said cylinder and for controlling the supply of air to said cylinder in response to the sensed pressure of said plunger against the labeling surface for retracting the plunger toward said first position.

20. Apparatus as set forth in claim 19, wherein said supply means include feeding means for feeding said label to a ready position adjacent and spaced from said face portion in said first position of the plunger, air jet means for pneumatically transferring said label from said ready position to said face portion, and jet control means for controlling operation of said air jet means in timed sequence with the moving and the retracting of said plunger.

21. Apparatus as set forth in claim 18, further comprising suction means, said face portion being formed with an opening connected to said suction means for drawing air inward of said opening and for thereby retaining a supplied label on said face portion during the moving of said plunger from said first position to said second position.

22. Apparatus as set forth in claim 21, further comprising suction control means for deactivating said suction means in timed sequence with the moving and the retracting of said plunger.

23. Apparatus as set forth in claim 21, wherein said face portion consists essentially of yieldably resilient material.

24. Apparatus as set forth in claim 18, wherein said arresting means include an abutment member including said pair of movable members, pneumatically operated abutment actuating means for moving said abutment member into and out of said path, and pneumatically operated control means controlling operation of said actuating means in timed sequence with the moving and the retracting of said plunger.

25. Apparatus as set forth in claim 18, wherein said arresting means include an upwardly open receptacle mounted for angular movement about an axis extending transversely of said path between two terminal positions and an intermediate position, said receptacle having two walls offset at an obtuse angle relative to one another, each of said walls being approximately alignable within said planar horizontal surface in one of said terminal positions, each said wall comprising said pair of movable members and pneumatically operated positioning means for sequentially positioning said receptacle in said positions thereof in timed sequence with said moving and said retracting of said plunger.

26. Apparatus, as set forth in claim 18, including a housing forming a chamber therein, said plunger mounted in the chamber in said housing and including an axially extending piston cylinder axially slidable relative to said housing, and said reversing means comprises a control valve attached to said housing and being actuated by said piston cylinder as it moves axially relative to said housing.

27. Apparatus, as set forth in claim 19, including guide means secured within said housing for guiding said piston cylinder, said piston cylinder being slidably displaceable relative to said guide means, and spring means in engagement with said guide means and said piston cylinder for biasing said piston cylinder in the axial direction thereof.

28. Apparatus, as set forth in claim 20, wherein said piston cylinder includes a piston rod and a piston head attached to the end of said piston rod outwardly from said piston cylinder, said piston head being movable into contact with the object to be labeled and said piston cylinder being movably displaceable when said piston head contacts the object be labeled.

29. Apparatus as set forth in claim 21, wherein at least one guide rod located in said housing for guiding said piston rod and piston head, a stop in said housing in the path of said guide rod and said guide rod being movable into contact with said stop during the movement of said piston rod and piston head toward the object to be labeled.

30. Apparatus, as set forth in claim 22, wherein said piston head having an end face for receiving labels to be transferred from the end face to the object to be labeled, an opening through said piston head being open at said end face thereof, said opening being arranged to be connected to a source of pressurized air.

31. Apparatus, as set forth in claim 23, including a pneumatically actuatable locking device located in said housing for holding said piston head in the retracted position.

32. Apparatus, as set forth in claim 24, wherein said locking device includes a spring biased locking member, a pneumatic cylinder including a piston rod displaceable into contact with said locking member for displacing said locking member into the unlocked position, said locking member being spring-biased into the locked position.

33. Apparatus, as set forth in claim 25, including an upwardly extending support for mounting said housing, means in combination with said upwardly extending support for adjustably positioning said housing in the vertical and horizontal directions.

34. Apparatus, as set forth in claim 26, wherein said arresting means comprises a traverse support extending across the direction of movement of the objects to be labeled over said conveying means, a pair of upwardly extending supports secured to said traverse support extending upwardly above said conveying means, a centering rod secured to the upper end of each of said supports and each said center rod being pivotably movable about the axis of said support between a first position extending inwardly over said conveying means and a second position spaced laterally outwardly from said first position so that in the first position said centering rods center and hold the object to be labeled in position and in the second position said centering rods release the labeled object for continued movement over said conveying means.

* * * * *